SCANNING INFRA-RED DETECTOR AND RECORDER

Filed Oct. 22, 1947 6 Sheets-Sheet 1

INVENTORS: W. H. BRATTAIN
N. G. WADE 3RD
BY G. H. Heydt
ATTORNEY

SCANNING INFRA-RED DETECTOR AND RECORDER

Filed Oct. 22, 1947 6 Sheets-Sheet 2

LOW PASS FILTER

HIGH PASS FILTER

INVENTORS: W. H. BRATTAIN
N. G. WADE 3RD
BY
G. H. Heydt
ATTORNEY

SCANNING INFRA-RED DETECTOR AND RECORDER

Filed Oct. 22, 1947 6 Sheets-Sheet 3

INVENTORS: W. H. BRATTAIN
N. G. WADE 3RD
BY
G. H. Heydt
ATTORNEY

INVENTORS: W. H. BRATTAIN
N. G. WADE 3RD
BY
G. H. Heydt
ATTORNEY

SCANNING INFRA-RED DETECTOR AND RECORDER

Filed Oct. 22, 1947 6 Sheets-Sheet 5

INVENTORS: W. H. BRATTAIN
N. G. WADE 3RD
BY
G. H. Heydt.
ATTORNEY

INVENTORS: W. H. BRATTAIN
N. G. WADE 3RD
BY
G. H. Heydt
ATTORNEY

United States Patent Office
3,022,374
Patented Feb. 20, 1962

3,022,374
SCANNING INFRA-RED DETECTOR AND RECORDER

Walter H. Brattain and Neill G. Wade 3rd, Morristown, N.J., assignors to Bell Telephone Laboratories, Incorporated, New York, N.Y., a corporation of New York Filed Oct. 22, 1947, Ser. No. 781,278
8 Claims. (Cl. 178—6.6)

This invention relates to radiant-energy detection systems and in particular to those systems and apparatus utilized for detecting and recording positions in azimuth and elevation of thermal-energy sources.

An object of the invention is to provide an efficient thermal-energy detector and recorder.

Another object is to provide a thermal-energy detector having a wide flexibility of usage and adaptable to diverse operating conditions.

A further object is to provide means for plotting a thermal-energy emission map of a terrain.

Other objects and uses of the invention will be apparent from a study of the specifications and drawings.

The system according to the invention may utilize ultraviolet, visible light and infra-red or any one of these bands. In the preferred embodiment of the invention infra-red radiations of wavelengths from 7000 to $4\times10^6$ angstrom units are used.

The system according to the preferred form of the invention detects and records small temperature boundaries encountered in an area under observation and indicates their positions in azimuth and elevation upon a chart in their relationship to the system, as determined in a suitable manner and as in reference to a datum line upon the chart. The system is also adaptable for use in an aeroplane for recording a heat map of the terrain below and registering such details as roads, factories, bridges and land to water boundaries.

Numerous thermal-energy detecting systems have been developed and achieve their purpose by initiating signals when a thermal-energy emission source is viewed by the particular system used. These systems usually rely for their efficiency upon the fixed sensitivity of the particular equipment utilized which results in their being capable or incapable of detecting a given thermal-energy source since they treat all sources and operating conditions alike. Accordingly, these systems do not possess the necessary flexibility to successfully cope with the varying observation conditions encountered in actual practice. In fact numerous varying conditions of observation are encountered, and no single optical system and few associated indication circuits are flexible enough to successfully contend with and overcome them. Examples of such detection problems are as follows: the degree of resolution between thermal-energy source signals and the range of recording necessary to register them; a weak thermal-energy source situated near a large thermal-energy emission source at a point source distance from the observing equipment; sources which have a higher temperature than their surroundings, also sources which have a lower temperature than their background; thermal-energy sources situated on or near the horizon with sky and sea backgrounds; scanning varying types of terrain from a fast moving aeroplane; the resolution and intensity of recording necessary when the extent of a scanned sector is varied; the speed of scan adaptable to conditions of observation encountered; differentiation between large and small thermal-energy sources. Some merits of the equipment according to the invention are the successful solution of these scanning problems.

The preferred embodiment of the invention comprises a mobile self-contained compact detection and recording system in which the operation of the recording mechanism is synchronized with the positioning of the optical unit. The system collects thermal-energy emissions from a sector under observation, and by utilization of an assortment of interchangeable thermal-energy sensitive elements various species of signal pulses may be originated, and detection of different classes of thermal-energy emission sources achieved. The signal pulses are modulated by any one of a plurality of signal pulse-shaping filters, and the polarity of the modulated pulses is changed at will. Optional types of rectification are available and the modulated signal pulses are further processed by rectification. The sort of sensitive element used and the modulation and rectification accorded a signal pulse depend upon whatever particular recording result is desired. These various features are incorporated within the system with an economy of equipment and render it readily adaptable for solving all kinds of scanning problems encountered in actual practice.

An element sensitive to thermal-energy emissions may be utilized as the sensitive element in the invention. Examples of such sensitive elements are thermocouples, thermopiles, photocells and bolometers. In the preferred embodiment of the invention a thermistor-bolometer is used. A bolometer is a thermal-sensitive device employed to detect and record minute quantities of thermal-energy. Thermistors may be manufactured in any suitable manner such as shown in United States Patent 2,414,793 issued January 28, 1947, to J. A. Becker and H. Christensen. Suitable materials for their manufacture are one or more of the oxides of iron, cobalt, nickel and uranium. Thermistors are characterized by a temperature coefficient of resistance which is many times the corresponding coefficient for pure metals such as copper. Some thermistors have a negative temperature coefficient of resistance, their resistance decreasing as their temperature increases. Thermistors of similar size but of different specific resistance are also available. A method of utilizing their characteristics comprises placing them in a circuit network in which they form arms of a normally balanced Wheatstone bridge configuration. Thermal-energy impinging upon a thermistor-arm changes the temperature of the arm, and causes a change in the resistance of the arm and a momentary unbalance of the bridge configuration. The momentary unbalance results in a potential variant across the bridge and this variant is amplified and modulated and fed to signal indication equipment. Since themistor-bolometers have resistances in the order of megohms they have suitable impedance to connect directly to vacuum tube grids. This characteristic is an advantage for no coupling transformers are required, but this high impedance prohibits the use of long connecting leads between the bolometer and the amplifier. These leads should be as short as are practical and also well insulated and shielded. In order to reproduce a thermal-energy image precisely a bolometer with a sufficiently short time constant is required so that at a particular scanning speed utilized the resultant voltage will be a replica in time of the heat picture viewed. The accuracy of the resultant thermal-picture will depend upon the shortness of the bolometer time constant. However, due to relationships between time constant and sensitivity an improved sensitivity will result from acceptance of a thermal-energy signal distorted in time from the true thermal-picture actually viewed. In recording thermal-energy emissions from a practical viewpoint the abrupt emission variations caused by boundaries and by small thermal-sources are usually the more important types of signals. In the system according to the particular embodiment of the invention disclosed, the equipment is primarily designed for optimum detection of localized thermal-energy sources small enough to be considered point sources. On this basis optimum results are obtained when bolometer time constant and exposure time are substantially equal. The exposure time necessary to view and record a thermal-energy point source is related to the speed of scan, width of the particular sensitive element in the bolometer and also to the efficiency of the optical units utilized. The system uses an assortment of interchangeable plug-in type bolometers containing one or more active elements, thus having available a variety of sizes and time constants in accordance with whatever particular result is desired.

A variety of signal indication equipment may be used to record thermal-energy signals. Examples of such devices are loudspeakers, neon indicators, audible alarms, oscilloscopes and recorders. While the problems encountered in scanning are more or less incident to all types of indication devices the results are more readily observed by use of recorders. In the preferred embodiment of the invention a recording mechanism is utilized. The recorded signal indications demonstrate pictorially the various types of signals registered by the equipment, also the results of signal-shaping and the particular advantages of the various signal-shaping methods. In the recording mechanism used in the system a relay actuated stylus marks a progressively moving chart paper. From a study of signal indications recorded under varying conditions of scan and while utilizing interchangeable units the following phenomena will be apparent: A signal from a thermal-energy point source tends to spread out upon the chart paper and the spread tends to increase as the frequency of the center of an associated amplifier pass band is decreased. The signal spread also increases as the gain used is increased above threshold gain for recording of a thermal-energy point source viewed. Also, all other factors being equal the signal spread is greatest when a three-lobed signal pulse is accorded full-wave rectification. However, use of a pass band double differentiation filter will result in less signal spread for a given center frequency. It will be understood that it is desirable to sometimes spread or contract signal marks depending upon particular results required.

Referring to the drawings.

Figures 1, 2:
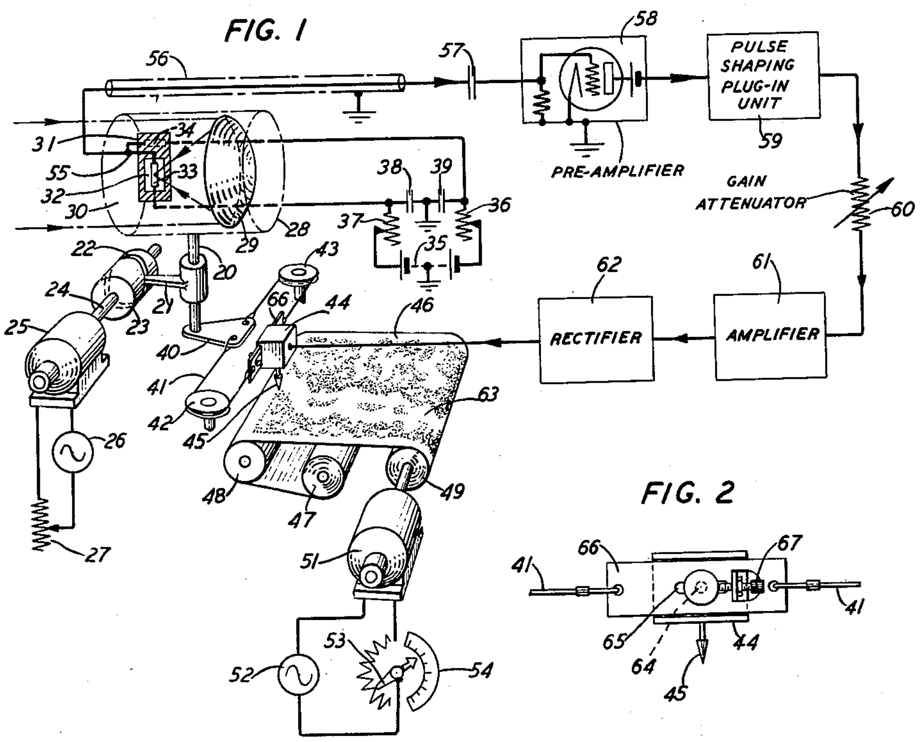
FIG. 1 illustrates diagrammatically an embodiment of a system for detecting and recording thermal-energy emission sources in accordance with the invention.
FIG. 2 is a detail of a lag mechanism in a mechanical linkage drive used in the system of FIG. 1.
Figure 10A:
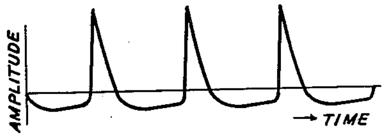
Figure 10B:
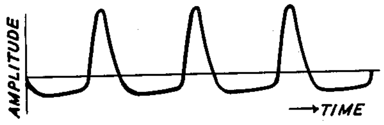
Figure 10C:
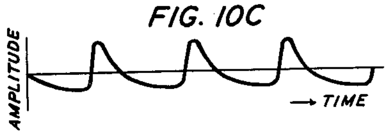
Figure 11A:
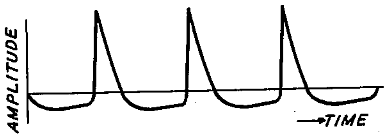
Figure 11B:
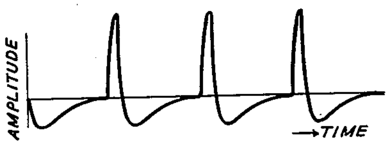
Figure 11C:
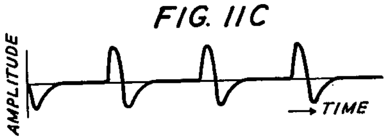
Figure 12:
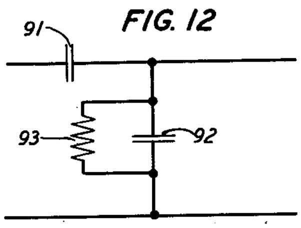
Figure 13:
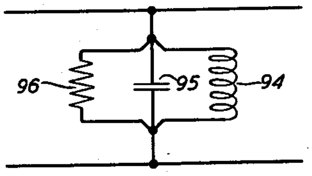
Figure 14:
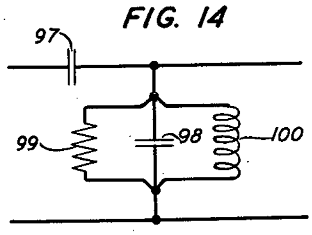
Figure 15:
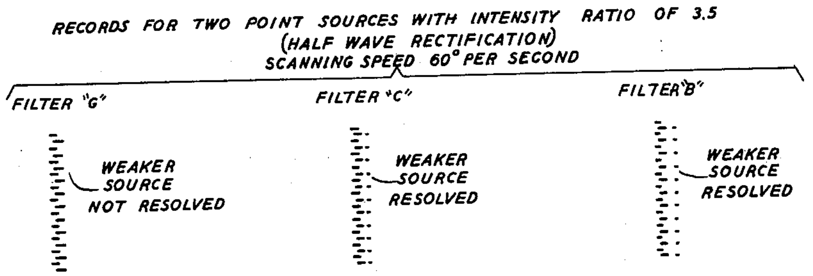
Figure 16:
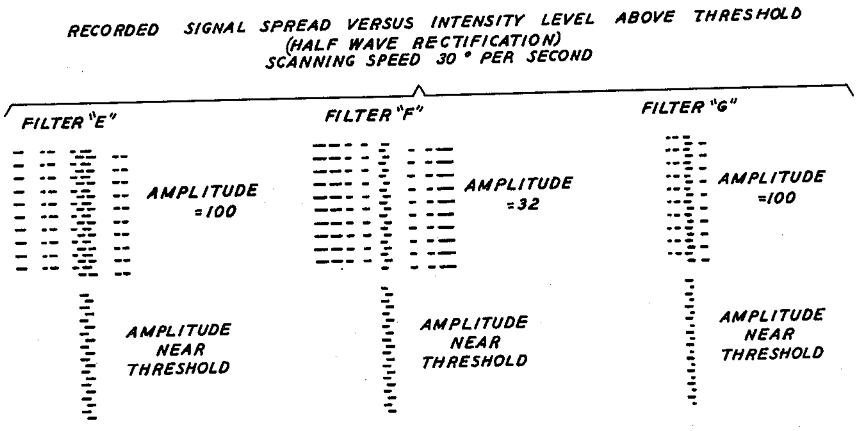
Figure 17:
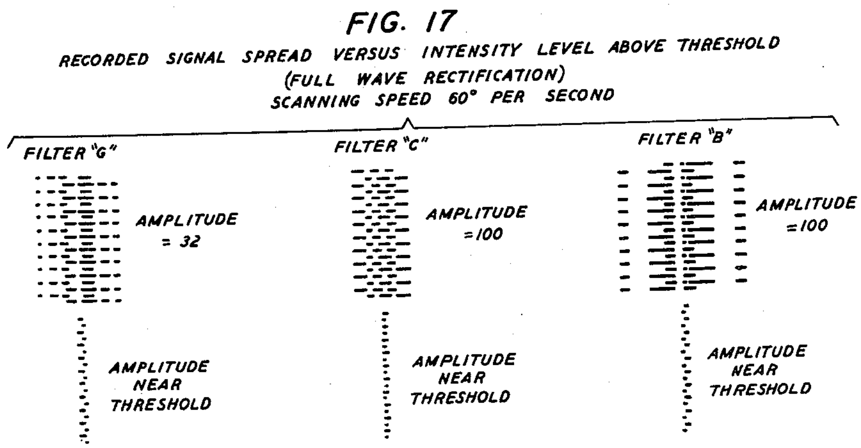
Figure 18:
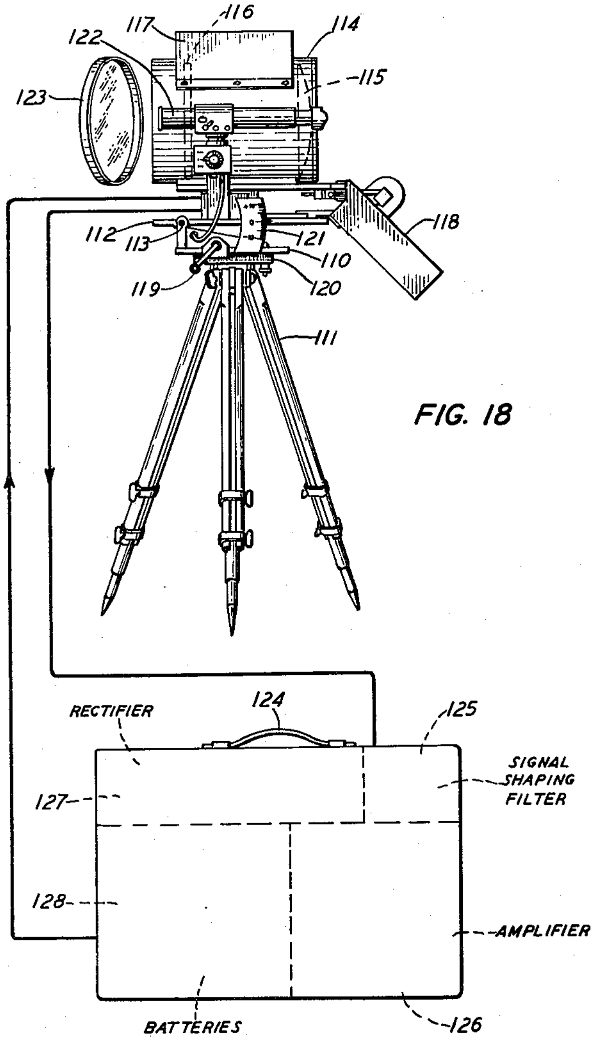

FIGS. 10A, 10B, and 10C show in graphic form the effects upon signal shapes when an amplifier response band is narrowed down from the high frequency side by use of a low-pass resistance-capacitance filter;

FIGS. 11A, 11B and 11C show in graphic form the effects upon signal shapes when an amplifier high frequency limit is fixed and low frequency components removed;

FIG. 12 is a schematic drawing of a single resistance-capacitance signal-shaping filter network used in conjunction with an amplifier in the system of FIG. 1;

FIG. 13 shows an inductance-capacitance-resistance signal-shaping filter network which may be used as an alternate to the filter shown in FIG. 12;

FIG. 14 shows schematically still another signal-shaping filter network which may be used as an alternate to those shown in FIGS. 12 and 13;

FIG. 15 illustrates graphically the effect upon signal resolution of two signal sources by use of signal-shaping networks similar to those shown in FIGS. 12, 13 and 14;

FIG. 16 shows graphically the effect upon the resolution of signals while using signal-shaping networks similar to those shown in FIGS. 12, 13 and 14 together with half-wave rectification of the shaped pulses;

FIG. 17 shows graphically the effect upon the resolution of signals while using signal-shaping networks similar to those shown in FIGS. 13 and 14 together with full-wave rectification of the pulses; and FIG. 18 is a schematic drawing of the system of FIG. 1 and shows the system assembled for operation.

Referring to FIG. 1, there is shown a vertical shaft 20 mounted for rotation. An arm 21 extends from the shaft 20 and rests within an endless spiral groove 22 upon a cylinder 23. The cylinder 23 is rotatable and is connected to a shaft 24 which is motivated by a variable speed motor 25. The motor 25 receives energy from an electromotive source 26 which includes in the connecting circuit a speed controlling device 27. When the motor 25 revolves the shaft 24, the resultant cylinder rotation causes the arm 21 to travel in the endless groove 22. This motion results in an oscillatory movement of the arm 21 and a uniform reciprocating angular motion of the arm is obtained from the rotary movement of the grooved cylinder 23. This motion is imparted from the arm 21 to the shaft 20. Mounted upon and attached to the shaft 20 is a cylindrical container 28. A scanning parabolic reflector 29 is secured within the container 28. Positioned within the container 28 and situated in the focal plane of the reflector 29 is a bolometer 30. The bolometer 30 includes a housing 31, a window 32 and contains two thermal-energy sensitive strips 33 and 34 composed of thermistor material. The bolometer housing 31 completely shields the strip 34 from radiations and shields the strip 33 from all thermal-energy radiations except those which may enter the bolometer 30 through the window 32 and impinge upon the front surface of the strip 33. The strips 33 and 34 are biased from a direct current source 35. Balancing resistors 36 and 37 are connected in the bolometer biasing circuit, and condensers 38 and 39 are connected across the circuit to ground as illustrated. The strips 33 and 34 form arms of a bridge configuration which is maintained in normal balance during scanning operations by adjustment of the resistors 36 and 37. Secured to shaft 20 is a plate 40 to which is attached a belt 41. The belt 41 is looped around a pair of pulleys 42 and 43. Attached to the belt 41 is a relay mechanism 44 which actuates a stylus 45. The stylus 45 is positioned over a progressively moving waxed paper 46. The oscillatory movement of the shaft 20 is transferred to the container 28 and to the plate 40. The oscillatory movement of the plate 40 causes the relay mechanism 44 including the stylus 45 to move back and forth above the paper 46. The paper 46 is drawn from a reservoir 47 around and over an idler roller 48 by means of a driver roller 49 to which an end of the paper is secured. The driver roller 49 is motivated by a variable speed motor 51 which is energized from an electromotive source 52 through a circuit which contains a speed regulating device 53 and a speed indicating mechanism 54. The common connection point 55 of the strips 33 and 34 is connected through a shielded cable 56 and a condenser 57 to an amplifying device 58. The amplifier 58 connects to a pulse-shaping plug-in unit 59, a gain attenuator 60, another amplifying device 61, and through a rectifying configuration 62 to the relay mechanism 44 which actuates the stylus 45. The various component parts of the equipment are suitably mounted upon supporting framework in a well-known manner.

When the optical unit comprising the reflector and sensitive elements is in position and an electrical pathway has been provided from the bolometer 30 to the relay 44, it is necessary to actuate the scannig units in container 28 through an arc in a cyclic fashion in order to provide the heat transient to upset the bridge balance. It is preferable to have the scanning velocity constant. In the type of scanning mechansim as used in this embodiment the angular turning velocity of the container 28 is reasonably linear but, if desired, allowance may be added in the design of cylinder 23 for each turnaround point at which the container is positioned at the extremity of oscillation.

The system operates as follows: The equipment is motivated in any well-known manner towards sections of an area under observation and the oscillatory movement of the container 28 causes the parabolic reflector 29 to perform an oscillatory scan of a section. Thermal-energy radiation originating within a section viewed by the reflector 29 is collected and focussed by the reflector through the window 32 in the bolometer 30 upon the exposed sensitive thermistor-strip 33. When in the course of the scanning operation a section is reached which is occupied by a body emitting a greater amount of radiation than the section per se a temperature-discontinuity occurs. The amount of thermal-energy collected and focussed by reflector 29 upon the strip 33 will then vary and will initiate a temperature variant in the strip. This temperature variant is translated into a resistance variant and initiates a momentary unbalance in the bridge circuit and a potential variant across the bridge between the point 55 and ground. This voltage variant is passed in the form of an alternating current signal through the condenser 57 to the amplifier 58. To provide suitable amplification of the signal pulses the amplifier utilized is divided into two units, and the first of these units 58 is situated close to the bolometer so as to shorten the distance traveled by the pulses before they receive amplification, and also to amplify the weak pulses in their original form before they progress further upon the journey through the pulse-shaping filter circuit 59, and the gain attenuator unit 60 to the remotely situated main amplifier 61. For purposes of ready identification the section of the amplifier closest to the bolometer is referred to as the preamplifier 58. Signals originating from the unbalanec of the bolometer-strips 33 and 34 are led from the main amplifier unit 61 through the rectifier 62 and energize the relay mechanism 44. This energization of the relay 44 motivates the stylus 45 and causes it to momentarily make contact with and mark the waxed paper 46. By a succession of such contacts in the course of a scanning operation the stylus 45 records a map, such as 63, of the area viewed upon the waxed paper 46. As shown, the position of the electromagnetically operated stylus 45 is synchronized mechanically with the angular position of the scanning reflector 29. The waxed paper 46 is advanced at the end of each scan so that fresh wax paper is in position to be marked by the stylus 45 in response to the signals from successive scans. An advantage of mechanically coupling the recording units to the scanning drive is the fact that it reduces the motor power, and it is in this respect more efficient than a remotely synchronized recorder. Also the wax paper relay recording method uses less power than other methods, such as electrolytic or spark recording papers. Since there is necessarily a time lag between the time a given point source is scanned by the reflector 29 and the time when the signal from this point source actually depresses the relay stylus 45, it is necessary to compensate for this lag. Otherwise the signals from a given thermal-energy point source would not record correctly on the waxed paper, for signals recorded on one scan would line up in one row and those from alternate scans in the opposite scanning direction would line up in another row. Any suitable mechanical compensating means may be utilized to compensate for this phenomena.

Referring to FIG. 2 there is shown an adjustable back-lash mechanism to accomplish compensation for signal lag. This mechanism connects the relay mechanism 44 to the driving belt 41. Relay mechanism 44 is supported on a pin 64 which has horizontal freedom of movement in a slotted yoke 65. The yoke 65 forms part of a section of steel tape 66 the ends of which connect to the driving belt 41. The extent of the horizontal freedom of movement of the pin 64 within the slotted yoke 65 is adjustably controllable by turning an adjusting screw 67. By means of the screw 67 the amount of back-lash is adjustable so that the stylus 45 obtains the proper operational lag and the two rows of signals mentioned above will coincide in a single row. A lag in stylus movement is a lead in time in so far as the position on the record is concerned and this lead is adjustable to compensate for any signal lag.

Figure 3:
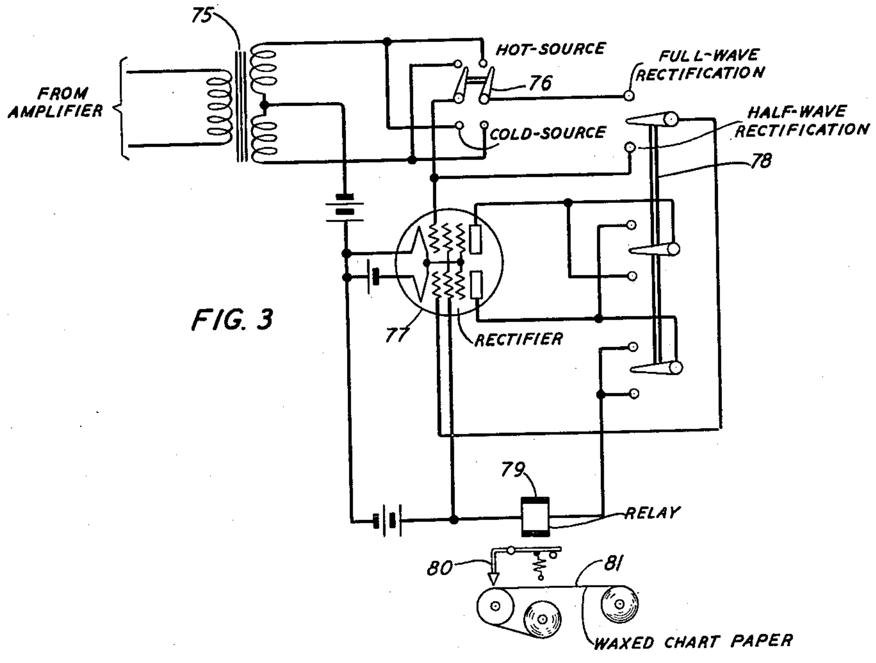
FIG. 3 is a schematic drawing of a rectification network coupled to the recording mechanism used in the system of FIG. 1.

Referring to FIG. 3, any suitable rectification network may be utilized by the system in accordance with the invention. Here is shown a convenient rectification configuration together with associated recording relay mechanism and apparatus for controlling the polarity of amplified signal pulses. The amplified thermal-energy signal from an amplifier is lead through a coupling transformer 75 to a double-pole double-throw switch 76. The switch 76 when thrown into its upper position causes the system to favor the recording of positions of hot thermal-energy sources by assuring that the polarity of the signal pulse is positive. When thrown into its lower position the switch causes the system to favor the recording of positions of cold thermal-energy sources by assurance that the polarity of the signal pulse is negative. From the switch 76 the signal pulse is rectified in the twin-pentode tube 77 the particular type of rectification accorded the signal pulse being determined by the position of a three-gang switch 78. When the switch 78 is in an upper position full-wave rectification of the signal pulse obtains. When the switch 78 is in a lower position half-wave rectification of the signal pulse results. Two kinds of half-wave rectification are provided for, the sign of the half-wave rectification output being determined by the position of the switch 76. The final output of the rectifier 77 energizes a relay 79 resulting in motivation of the stylus 80 and contact of the stylus 80 with the chart paper 81, as discussed in relation to FIG. 1.

Figure 4:
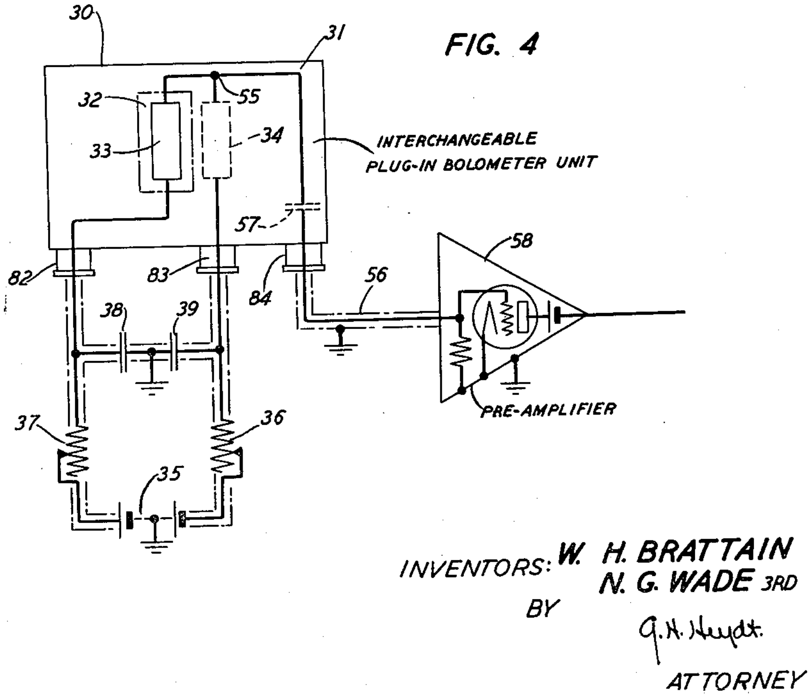
FIG. 4 is a schematic illustration of a thermistor-bolometer configuration used in the system of FIG. 1.

FIG. 4 illustrates in detail a plug-in interchangeable bolometer such as used in the system. The particular bolometer arrangement shown is similar to that utilized and described in connection with FIG. 1. The bolometer housing 31 is supported upon three contact plugs 82, 83 and 84 which are arranged to fit into any suitable receptacle. The sensitive strips 33 and 34 may be prealigned in manufacture, and when the bolometer unit 30 is placed in position it is in correct focus. The biasing circuit is similar to that shown in FIG. 1. By utilization of interchangeable plug-in bolometers the optical unit of the system is readily adaptable to different conditions of scan. A variety of these units containing different configurations may be utilized.

Figure 5:
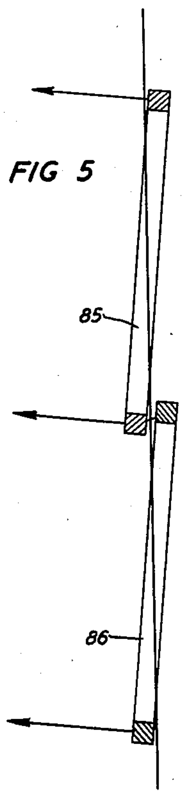
FIG. 5 is a schematic drawing of sensitive elements which may be used in the bolometer system of FIG. 4.

Referring to FIG. 5, there is shown a bolometer configuration arrangement suitable for use in plotting a map of average terrain. Two thermistor strips 85 and 86 may be positioned within the bolometer at an oblique angle in respect to a vertical axis as illustrated and both of the strips are exposed to radiations which may impinge upon them through the window in the bolometer. Electrical electrode connections are made at the extremities of the strips and they are joined together as shown. The strips are adapted to connect to a bridge network such as shown in FIG. 4. It will be noted that equal areas of the strips lie on each side of the vertical line and the strips overlap at their common connection point. The advantage of the oblique angle positioning is to allow the strips 85 and 86 to overlap at the center and to minimize the inert or insensitive area caused by the electrical connections, also to have them aligned so that a long extended source, such as a tree, would be imaged upon both strips at the same time. When an extended long thermal-energy source is imaged upon both strips at the same time equal signals will be originated in each strip and these will cancel out and maintain balance in the associated bridge network. Small thermal-energy emission sources will cross either strip 85 or strip 86 and will originate full strength signals in one strip thus unbalancing the bridge network. By use of a bolometer with sensitive strips positioned in this manner a large area may be scanned in one scanning sweep without reducing the equipment sensitivity to small thermal-energy sources. It will be understood that by varying the lengths of the strips 85 and 86 different sensitivity results may be obtained.

Figure 6:
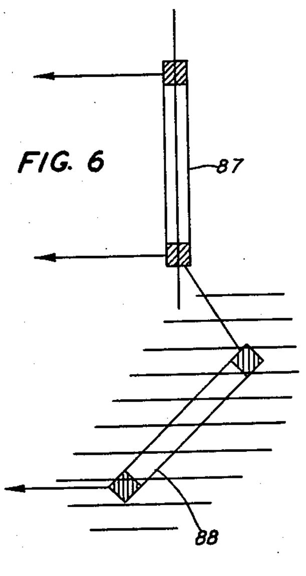
FIG. 6 is a schematic of alternate sensitive elements for use in the bolometer system of FIG. 4.

Referring to FIG. 6, there is shown another type of bolometer element configuration similar to those discussed in relation to FIGS. 1 and 4. Two sensitive strips 87 and 88 are connected as shown. Strip 88 is shielded from impinging radiation while strip 87 is exposed to thermal-energy radiation. This type of bolometer element network conveys a truer thermal-heat picture than does the configuration shown in FIG. 5. It does not distinguish however between point sources and sources of vertical angular height equal to that of the bolometer.

Figure 7:
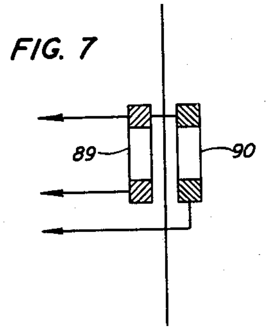
FIG. 7 is a schematic of other alternate sensitive elements for use in the bolometer of FIG. 4.

FIG. 7 shows another bolometer configuration. Herein two sensitive thermal-energy strips 89 and 90 may be situated side by side within a bolometer housing and both strips exposed to impinging thermal-energy radiations. When a thermal-energy image sweeps across the strips 89 and 90 it originates signal pulses. In the simple case of a point discontinuity in the thermal-energy received from an otherwise uniform background the passage of a thermal-image across strip 89 will occasion a heating or a cooling of the strip depending upon the type of source encountered and the polarity of the strip. The temperature change of the strip results in a small change in the strip resistance and since there is a direct-current voltage biasing the strips, a corresponding decrease or increase in the voltage drop across the strip. As the thermal-image passes beyond strip 89 the resistance, and hence the voltage drop returns to normal. However as the thermal-image progresses and impinges upon strip 90 a similar but oppositely poled voltage change occurs. As a result of these actions the rate of change of the potential at the junction point of the strips is the sum of the changes due to the cooling of strip 89 and the heating or strip 90. Finally as the thermal-energy image emerges from strip 90 the resistance and voltage potentials across both strips 89 and 90 return to normal. As the scan reverses the voltage changes are reversed.

The bolometer configurations of FIGS. 5, 6 and 7 may be biased from a circuit such as shown in FIG. 4.

Figure 8:
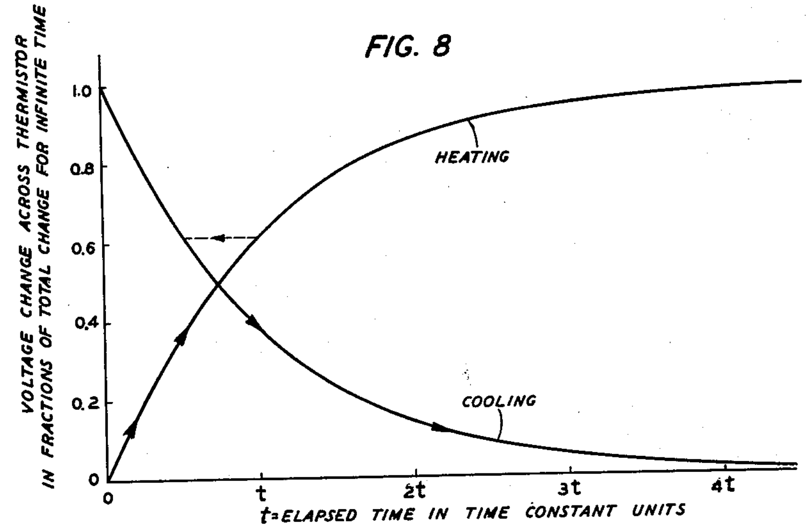
FIG. 8 illustrates graphically a thermistor-bolometer heat response for a single time constant.

Referring to FIG. 8, therein is shown in graphic form a thermistor response for an idealized case. When thermal-energy power is suddenly incident upon a thermistor-strip the voltage across the associated bridge circuit will increase with time as shown in this curve, time being plotted in multiples of a bolometer time constant $t$. If, after any given time $t$, the thermal-energy power is removed the voltage will decrease with time starting with the voltage value that was reached before the thermal-energy power was withdrawn. For example, suppose the voltage rise has reached the position 0.62 upon the heating curve, then starting at position 0.62 on the cooling curve the voltage decreases with time along this curve. By studying the curve the voltage wave shape for a square-topped power pulse of any $t$ duration can be readily determined. However, thermal-energy signals obtained in actual scanning operations will generally not be square pulses. If the time the power is incident is large as compared to $t$, then the voltage wave will be substantially a square-topped one, since the time to heat and cool is short when compared with the pulse duration. If the duration of the thermal-energy signal is short compared to $t$, then the voltage signal has a short almost linear rise for the time the heat signal is effective, with a long exponential tail after the heat signal is shut off.

In thermal-energy detection systems the shape of thermal-energy signals recorded will depend on the particular thermal picture scanner, on the quality of the optical equipment utilized including the dimensions of the thermal-energy sensitive elements in the bolometer. The shape of the voltage wave resulting from thermal-energy signals will also depend on the bolometer time constant.

Figure 9:
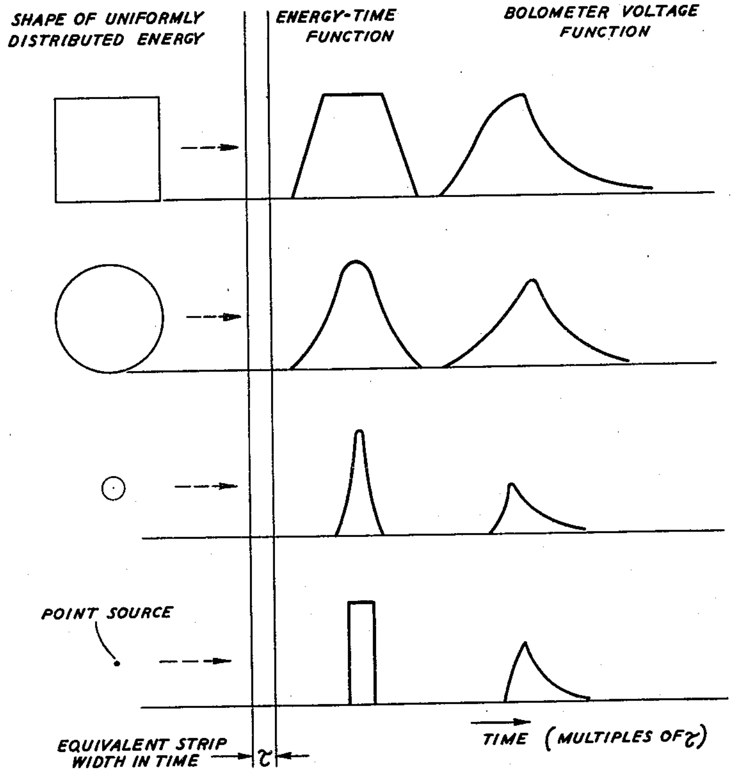
FIG. 9 illustrates graphically shapes of thermal-energy images received by a system such as shown in FIG. 1, together with resulting heat waves and voltage wave signals.

In FIG. 9 are shown some assumed shapes for a thermal-energy input together with resulting heat-wave and voltage-wave signals all plotted with intensity as ordinates and time as abscissae. In the first column some assumed shapes of heat images are shown, then follows the bolometer strip widths, then the shape of the thermal-energy wave in time, and finally the approximate shape of the output voltage wave to be expected across the bolometer bridge. It is to be understood that the scanning speed is such that a point source image will cross the bolometer strip in a time equal to that of the bolometer-strip time constant. The peak intensities of the thermal-energy wave are considered equal in all these examples. The graph conveys a general idea of the types of voltage wave received regardless of whether a heat image is extended due to distortion by the optical units or due to the fact that the actual heat source is extended. When these voltages or transients are fed through an amplifier they will be distorted unless the amplifier has a very broad frequency response extending from zero cycles per second to very high frequencies. This requisite flexibility for efficient operation of a detection system may be attained by use of a wide-band amplifier and by providing an assortment of interchangeable signal-shaping units for controlling the amplifier pass-band. The particular units used will affect the width of the recording stylus mark which is coupled to the system resolution. Also, for a given signal level the gain of the system may be lowered by attenuating devices which may follow and/or precede the amplifier and which may have, for example, a range of twenty decibels in one decibel step, or eighty decibels in twenty decibel steps. Other factors involved are the need for an efficient optical system together with the consideration of useful angular scanning ranges and speeds, also shape and size of the thermal-energy sensitive element used, and the shape and size of the thermal-energy emission source scanned. There is also need for an electrical channel which will receive optimum results from the arbitrary bolometer transient form as determined by the optics and dynamics of scan. The form of output wave from the channel will also be somewhat modified by the type of recorder mechanism it actuates. Finally, in devices of this type considerable electrical gain is necessary, since the lower limit thermal-energy noise in the bolometer is determined by the bridge biasing voltage.

The amplifier as used in the preferred embodiment of the invention is designed along principles well known to those skilled in the art and may be a broad-band amplifier such as Electrical Research Products amplifier RA333 having a pass-band selective transmisison characteristic extending from frequencies below to far above that of the signal pulse frequencies. The amount of distortion of a thermal-energy signal pulse by the amplifier will depend upon the type of filter circuit used to narrow the amplifier pass-band.

Referring to FIGS. 10A, 10B and 10C there are shown effects upon amplified thermal-energy signal pulses when the amplifier low frequency cut-off point is fixed and the amplifier response band is narrowed down from the high frequency limit by use of a single section low-pass resistance-capacitance filter. It will be understood that it is general practice to use the point where the amplitude response is down three decibels, or a factor of one-half in power, as a measure of the frequency limit or cut-off point. FIG. 10A shows the processing of a signal while utilizing the full band width of the amplifier. The tendency of alternating current amplifiers to equalize the wave area on each side of the zero line may be observed from a study of this graph. FIG. 10B shows the effect upon thermal-energy signal shapes of lowering the high frequency three decibel points to one hundred and forty cycles per second. FIG. 10C shows effects upon signal shapes when the high frequency three decibel cut-off point is lowered to twenty-six cycles per second. A study of FIGS. 10A, 10B and 10C shows that the voltage signal wave is broadened in time and the magnitude of the signal is decreased. A conclusion may be stated that removing high frequency components from signal pulses reduces the signal amplitude and increases the duration of the signal.

Referring to FIGS. 11A, 11B and 11C there are shown the results obtained by fixing the amplifier high frequency limit at about fifteen hundred cycles per second and narrowing the pass-band from the low frequency cut-off point by using a high-pass single section resistance-capacitance filter. Referring to FIG. 11A here is shown the processing of a thermal-energy signal while utilizing the full band width of the amplifier as in FIG. 10A. In FIG. 11B there are shown effects upon the thermal-energy signal shape of raising the low frequency cut-off point to thirty-two cycles per second. FIG. 11C shows the effects of raising the low frequency cut-off point to one hundred and sixty cycles per second. From a study of FIGS. 11A, 11B and 11C it appears that as the low frequency cut-off point is raised the signal wave shapes approach closer and closer to the shape of a perfect derivative of the undistorted input thermal-energy signal wave. As this derivative form is approached the portion of the signal wave having a positive slope with respect to time is replaced by a positive peak in the output signal wave. Similarly the portion of the input wave having a negative slope is replaced by a negative peak in the output wave. The position of the three decibel cut-off point at the low frequency end of the amplifier pass-band has very small effect on thermal-noise output since the amplifier total band width in cycles is relatively unchanged. The upper cut-off point may be fixed at fifteen hundred cycles while the lower three decibel cut-off points may be extended in a range from two to one hundred cycles per second. It may be concluded that when low frequency components are removed the voltage wave signal does not spread in time. The removal of frequency components below ten cycles per second has very little effect on the amplitude of the first voltage wave peak. Setting the three decibel cut-off point at about one hundred cycles per second will reduce the wave amplitude about fifty percent. The position of the cut-off point at the low frequency end of the pass-band has small effect on the thermal-noise output. To obtain the signal indications shown in FIGS. 10A, B and C, also in FIGS. 11A, B and C, the heat power utilized was held active for a time period of three milliseconds and inactive for thirty milliseconds.

The width of each pass-band is substantially equal to the center frequency of the band. As the center frequency is decreased the signal-to-noise ratio rises, and as the width of the pass-band is decreased the signal-to-noise ratio also increases. The degree of resolution is decreased as the center frequency is lowered. The effect of pass-band width on resolution of signals is also contrary to the effect of pass-band width upon signal-to-noise ratio. In order to obtain the maximum signal-to-noise ratio and to achieve the maximum resolution a reasonable compromise between these factors is necessary. For example, in order to detect ships on water stationed near the horizon, an optimum signal-shaping filter would have a center frequency of about twenty-seven cycles per second, for in this case maximum sensitivity is the primary consideration. When scanning average terrain from an airplane the degree of resolution is of primary importance and a center frequency of about ninety cycles per second is optimum. When the background on land becomes substantially uniform, such as that occurring with a wholly overcast sky, after rainfall, and after midnight, a center frequency below ninety cycles per second may be optimum.

The factors which determine maximum signal-to-noise ratio and optimum resolution of thermal-energy signals may be summarized as follows: As the center frequency is decreased the signal-to-noise ratio rises. Similarly, as we decrease the width of the pass-band or decrease the ratio of the width of the pass-band to the center frequency of the pass-band, the signal-to-noise ratio increases. However, the degree of resolution decreases as the center frequency of the pass-band is decreased. The effect of pass-band width on resolution is also contrary to its effect on signal-to-noise ratio. In practice, these general trends are somewhat altered by factors other than pass-band, but for detection of a given thermal-energy source a reasonable compromise is advisable between the requirements for maximum signal-to-noise ratio and maximum resolution of the source by the detection system. An important factor in detection equipment such as described herein involves the degree of resolution between signals and the range of recording density required in the final record. Maximum signal-to-noise ratio is a desired condition when searching for one or more thermal-energy sources located against a uniform background. If the background is non-uniform the added problem of resolution arises. It is also sometimes necessary to detect weak thermal-energy signals situated in proximity to strong thermal-energy signal sources. Accordingly, a large signal-to-noise ratio is of small value when the detected signal is situated in a non-random noise background. If a background signal is strong and the equipment gain is raised in order to detect a weaker signal, the strong signal has a tendency to spread on the wax recording paper. It is then advisable to have the signal-mark width of a point source as narrow as possible, and the increase in width of a recorded mark should be relatively small when the equipment gain is increased above threshold.

In the particular embodiment of the invention described herein the necessary circuits for shaping or filtering the thermal-energy signal pulses were designed in the form of interchangeable plug-in units, and were adapted for placement in the system between the preamplifier and the main amplifier. Typical examples of these signal-shaping plug-in circuits are shown in FIGS. 12, 13 and 14. Referring to FIG. 12 here is shown a single resistance-capacity network comprising condensers 91 and 92 and a resistance 93. The particular values of condensers 91 and 92 are determined by whatever band width is desired. All the signal-shaping effects discussed in relation to FIGS. 10A, 10B, 10C and 11A, 11B, 11C may be obtained by use of this signal-shaping filter network. Where it is desired that the output signal should have the shape of the original signal wave this filter network will be advantageous on account of the gradual change in phase shift involved in its use. Referring to FIG. 13, here is shown a plug-in filter network comprising a resonant circuit containing an inductance 94, condenser 95, and a resistance 96. The first differential of a signal pulse may be attained with this type of filter with a narrow pass-band and greater signal-to-noise ratio than can be achieved by use of the filter of FIG. 12. Referring to FIG. 14 here is shown a high-pass filter network comprising condensers 97 and 98, a resistance 99 and an inductance 100. First and second differentiations of a signal wave can be achieved by use of this circuit, but this filter circuit has a less favorable signal-to-noise ratio than the filters of FIGS. 12 and 13.

It will be appreciated that the filters shown in FIGS. 12, 13 and 14 are not the only forms of pulse-shaping circuits to achieve similar results. The filter units used may vary in center frequency from twenty to five hundred cycles per second. Below are shown typical filter values which may be utilized in the invention.

| Plug-in Unit Filter | Type | Center Frequency, Cycles per Second $f_0$ | Band Width, Cycles per Second $\Delta f$ |
|---|---|---|---|
| A | Resistance-Capacitance | 30 | 75 |
| B | do | 150 | 285 |
| C | Inductance-Resistance-Capacitance | 85 | 105 |
| D | do | 150 | 145 |
| E | do | 27 | 23 |
| F | do | 40 | 36 |
| G | do | 85 | 54 |
| H | do | 45 | 60 |
| I | do | 360 | 190 |

Filter A will pass the signal voltage pulse with relatively little distortion. Filter B will differentiate the signal voltage pulse once. Filters C, D, H and I are damped and will differentiate the signal voltage pulse once. Filters E, F and G are under-damped and will convert the signal voltage pulse into a three-lobed pulse.

A brief discussion of the various relationships between the center frequency, width of the amplifier pass-band and the signal-to-noise ratio may be helpful. In detection equipment, such as discussed in this embodiment of the invention, the shape of the thermal-energy signal is not the only problem involved. Any signal may be detected until a point is reached whereat the signal becomes weak when compared with the surrounding unavoidable extraneous noise, signal-to-noise ratio being the optimum that may be attained in detecting the smallest possible signal. Probably the most important type of noise occurring in thermal-energy detection equipment is microphonic sensitivity caused by mechanical shocks incidental to rapid reversals of the scanning head. Any element of the input circuit which has a capacity to ground and which is biased at more than a few volts with respect to ground becomes effectively a condenser microphone. Slight movement of this element caused by vibrations may change the element capacity to ground and induce an electrical noise transient. This possibility may be offset by making sensitive leads rigid, mechanically insulating sensitive circuits from vibration by means of resilient mountings, and by reducing the bias potential on the thermal-energy sensitive element the microphonic sensitivity of the system is reduced in proportion. Other sources of extraneous noise are thermal or Johnson noises which are due to voltage fluctuation across resistances, current noise which occurs when current flows through the various circuit elements, and vacuum tube noise arising from the various phenomena occurring in the associated vacuum tubes. Johnson noise depends on the magnitude of resistance, the absolute temperature involved and the frequency band width in cycles per second. The current and vacuum tube noises tend to be concentrated in the lower frequencies close to zero frequency and proper design of the equipment will generally reduce them to a small value compared with the thermal or Johnson noise. However, the design is difficult if the equipment utilizes very low frequencies close to zero frequency. The practical procedure to follow is to study the signal shape and the signal-to-noise ratio as a function of amplifier phase and frequency characteristics. If the particular scanning problem involved is the location and recording of temperature boundaries or discontinuities in an area of scan, it is advisable to remove the low frequency components of the signal wave to the extent necessary to obtain an approximate derivative of the input voltage transient. Also, signal-to-noise ratio will be improved by removing as many of the high frequency components of the signal wave as it is possible to do without appreciably increasing the time duration of the amplifier output signal pulse.

If all other factors are equal signal gain is greatest for full-wave rectification of a three-lobed pulse. The result of a double differentiation of a signal pulse by a shaping filter such as filter "C," comprising inductance, resistance, capacitance, and with a center frequency of eighty-five cycles, will result in less signal spread for a given center frequency. Another and more critical test for resolution is to detect and record two thermal-energy sources situated close together, one source being, for example, three times, or ten decibels, more intense than the other. An electrical pass-band composed of a single high and low-pass resistance-capacitance filter section having cut-off points at fifty and five hundred cycles will achieve this result. The signals recorded for an electrical channel as described would be those due to small thermal-energy sources or temperature boundaries. The signal from a thermal-energy point source will have two lobes, one positive and one negative, and a temperature boundary will originate a unidirectional voltage signal pulse of either a positive or negative polarity. The time duration of the signal would be short measuring from three to ten milliseconds thus making it possible to resolve two thermal-energy sources situated close to each other.

Referring to FIG. 15 there are shown the effects obtained by using three different signal-shaping filters. In the first column are shown the results obtained when filter "G" was utilized. Herein the first and third lobes of the signal pulse being too large the weak emission source is blanked out by the recorded spread of the stronger thermal-energy source. Filter "C" was used to obtain the results shown in the second column. Here the weaker signal registers on every other scan when the equipment electrical gain is increased twenty decibels, which is ten decibels more than the threshold of the weaker source. The results obtained by using filter "B" are shown in the third column and this filter also succeeded in resolving the weaker thermal-energy source.

In FIG. 16 are shown signal widths obtained while utilizing three different signal shaping filters, scanning at a speed of thirty degrees per second, and using half-wave rectification of the signal pulse so as to pass the center lobe of the pulse. With filter "E" the recording marks increase in width as the gain is increased and side signals due to a fourth lobe of the pulse appear when the gain is increased twenty decibels. These side signals occur on opposite sides of the main signal on every other scan. The recorded marks obtained with filter "F" keep the same width, and side signals do not occur until the gain has been increased over twenty decibels. Signal recordings obtained with filter "G" do not keep the same width as efficiently as do the signals obtained with filter "F."

Referring to FIG. 17, the signal marks shown are the same in their general purpose as those shown and discussed in relation to FIG. 16, except that full-wave rectification of the signal pulse is utilized. Filters "C" and "B" are substituted for filters "E" and "F" as used to obtain the results shown in FIG. 16.

With a knowledge of the results obtainable by utilizing different types of signal-shaping networks and with a description of the recordings, each signal record may be interpreted. The correct shaping network may thus be used to obtain a particular result.

Referring to FIG. 18, there is shown a detection system in accordance with a particular embodiment of the invention. A stand 110 is rotatably mounted on a tripod 111. A table 112 is pivotally coupled to the stand 110 by means of a pivot mechanism 113. Mounted upon the table 112 is a container 114 within which is a parabolic reflector 115, and a bolometer mounting post 116. Mounted on the container 114 is a preamplifier 117. Attached to the table 112 is a recording mechanism 118. The mounting stand 110 may be rotated by operation of a crank 119 and the stand position in azimuth observed from an azimuth indicator 120. The table 112 may be tilted upon the pivot 113 and the table tilt in elevation observed from a tilt indicator 121. To position the equipment a telescope 122 may be utilized. A filter mask 123, shown removed, is adapted to fit over the front opening of the container 114. The filter of the mask may comprise a sheet of sodium-chloride or other suitable material that will pass infra-red radiation and exclude unwanted energies. The equipment is electrically connected by cable to a carrying case 124 which contains a signal-shaping plug-in filter 125, a main amplifier 126, a rectifier 127 and associated batteries 128.

It is to be understood that the methods, systems and instrumentalities herein described and illustrated are for illustrative purposes and that modification in design, arrangement and procedure may be substituted within the scope of the following claims.

What is claimed is:

1. In a thermal-energy detection and recording system for scanning an area under observation and producing a thermal-energy map depicting the positions of thermal-energy sources situated within said area relative to a reference line upon said map, the combination of a plurality of interchangeable elements each sensitive to thermal energy, means for scanning said area to collect thermal-energy emissions emanating therefrom and to focus said collected emissions upon a selected one of said elements, an indication circuit responsive to said element, means in said circuit for initiating electrical pulses corresponding to variations in the thermal energy focussed upon said element, amplification means including an input circuit and an output circuit, said indication circuit being connected to said input circuit, said amplification means having an adjustable pass-band transmission characteristic extending from frequencies below to far above that of said pulse frequencies, means to adjust the width of said pass band, said adjusting means including means for increasing and decreasing the center frequency of a pass band of selected width, a recording medium providing a surface upon which said map is to be formed, marking means connected to said output circuit and cooperating with said medium, means to move said marking means across said surface and into operative relation with said medium, means for coordinating the relative movement of said marking means with the directional positioning of said scanning means so that each thermal-energy source in said area is identified by a corresponding indication, and means responsive to said pass band width adjusting means to control the resolving power of said marking means.

2. System according to claim 1, including a rectifier interposed between said amplifier and said marking means.

3. System according to claim 1, including a bridge circuit into which one of said sensitive elements is connected, and means to unbalance said bridge and generate a voltage transient in response to variations in the thermal-energy radiations focussed upon said element.

4. System according to claim 1, including a bridge circuit into opposite arms of which a pair of said sensitive elements are connected, and means to unbalance said bridge and generate a voltage transient in response to variations in the thermal-energy radiations focussed upon one of said elements.

5. System according to claim 1, including a bridge circuit into opposite arms of which a pair of said sensitive elements are connected, one of said elements being so mounted as to respond to ambient temperatures, the other of said elements being responsive to thermal-energy radiations focussed upon it by said scanning means, and means to unbalance said bridge in response to variations in said focussed radiations.

6. System according to claim 2 in which said rectifier comprises a rectifying network including a full wave rectifier and switching means to convert said full-wave rectifier into two half-wave rectifiers.

7. System according to claim 2 in which said rectifier comprises a rectifying network including two half-wave rectifiers and switching means to render effective a selected one of said half-wave rectifiers, whereby said marking means may be made to respond at will to either increments or decrements in the normal amount of thermal energy focussed upon said sensitive element.

8. In a thermal-energy detection and recording system for scanning an area under observation and producing a thermal-energy map depicting the positions of thermal-energy sources situated within said area relative to a reference line upon said map, the combination of a plurality of interchangeable elements each sensitive to thermal energy, means for scanning said area to collect thermal-energy emissions emanating therefrom and to focus said collected emissions upon a selected one of said elements, an indication circuit responsive to said elements, means in said circuit for initiating electrical pulses corresponding to variations in the thermal energy focussed upon said element, amplification means including an input circuit and an output circuit, said indication circuit being connected to said input circuit, a recording medium providing a surface upon which said map is to be formed, marking means connected to said output circuit and co-operating with said medium, means to move said marking means across said surface and into operative relation with said medium, means for coordinating the relative movement of said marking means with the directional positioning of said scanning means so that each thermal-energy source in said area is identified by a corresponding indication, and a rectifying network interposed in the connection from said output circuit to said marking means, said rectifier network including two half-wave rectifiers and switching means to render effective a selected one of said half-wave rectifiers whereby said marking means may be made to respond at will to either increments or decrements in the normal amount of thermal energy focussed upon said sensitive element.

References Cited in the file of this patent

UNITED STATES PATENTS

| | | |
|---|---|---|
| 2,237,193 | Mosby | Apr. 1, 1941 |
| 2,315,671 | Tawney | Apr. 6, 1943 |
| 2,320,476 | Schrader et al. | June 1, 1943 |
| 2,375,273 | Black | May 8, 1945 |
| 2,405,930 | Goldberg et al. | Aug. 13, 1946 |
| 2,411,120 | Hortenau | Nov. 12, 1946 |
| 2,412,165 | McDermott | Dec. 3, 1946 |
| 2,421,138 | Wheeler | May 27, 1947 |
| 2,422,295 | Eaton | June 17, 1947 |
| 2,430,283 | Epstein | Nov. 4, 1947 |
| 2,430,307 | Smith | Nov. 4, 1947 |
| 2,434,921 | Grieg | Jan. 27, 1948 |
| 2,467,120 | Evans | Apr. 12, 1949 |
| 2,492,120 | Smith | Dec. 20, 1949 |
| 2,539,553 | Rich | Jan. 30, 1951 |
| 2,540,963 | Rutherford et al. | Feb. 6, 1951 |
| 2,542,490 | Ehrenfried | Feb. 20, 1951 |

FOREIGN PATENTS

| | | |
|---|---|---|
| 813,404 | France | June 1, 1937 |